Oct. 26, 1965  H. L. RAFFMAN  3,213,541
X-RAY CALIPERS
Filed July 1, 1963
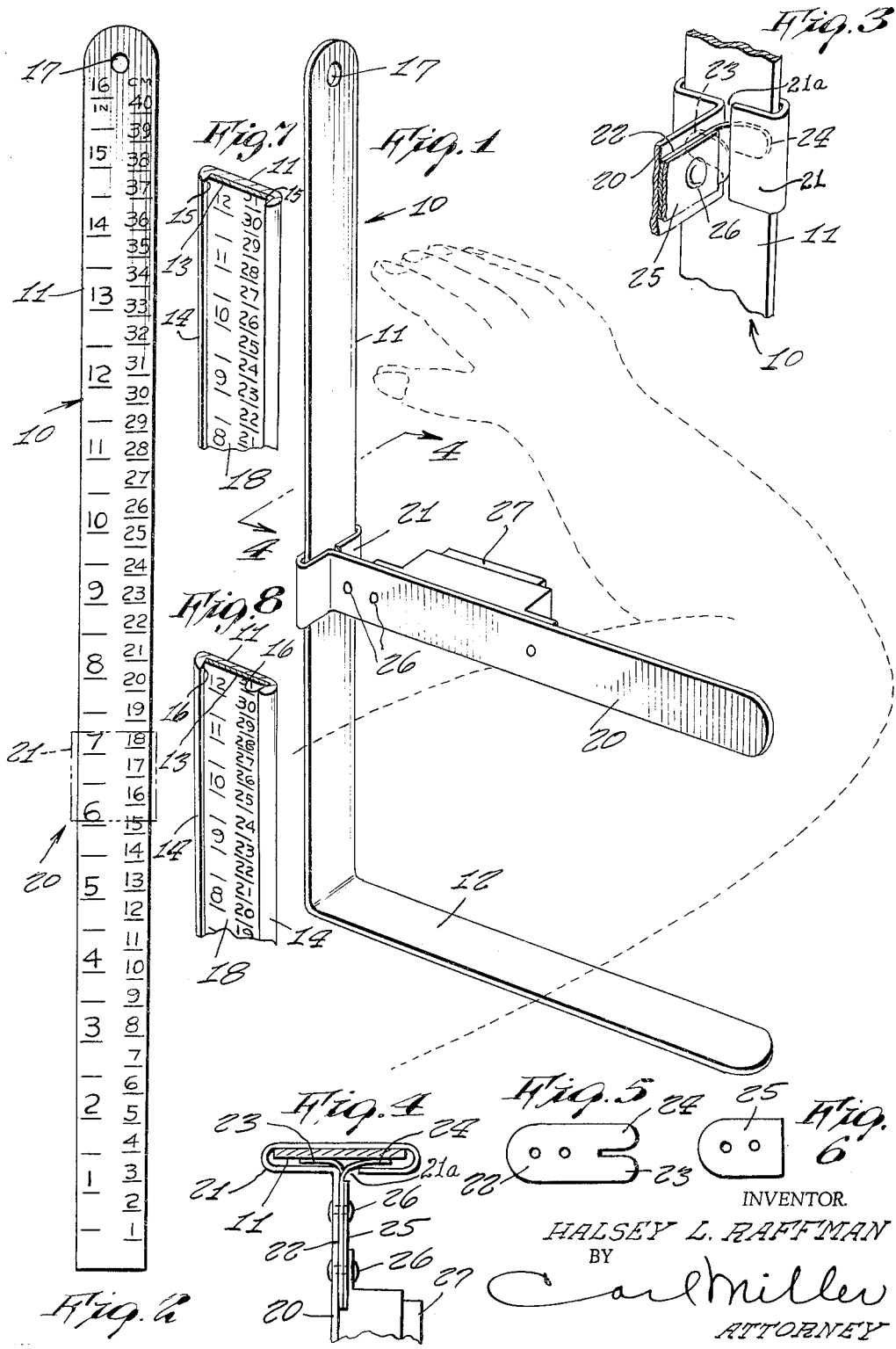
INVENTOR.
HALSEY L. RAFFMAN
BY
Carl Miller
ATTORNEY

United States Patent Office 3,213,541
Patented Oct. 26, 1965

3,213,541
X-RAY CALIPERS
Halsey L. Raffman, c/o Halsey X-Ray Products, Inc.,
1435 37th St., Brooklyn, N.Y.
Filed July 1, 1963, Ser. No. 291,635
2 Claims. (Cl. 33—143)

This invention relates generally to measuring devices and more particularly to an X-ray caliper adapted for easy measurement of the thickness of a part of the human body.

X-ray calipers are utilized for measuring parts of the body for determining proper exposure times. Such calipers presently available are expensive to manufacture and have limited life due to wear.

Accordingly, an object of this invention is to provide X-ray calipers that are ruggedly constructed and relatively inexpensive to manufacture.

Another object of this invention is to provide the foregoing X-ray calipers that are inexpensively repaired with facility.

And another object of this invention is to provide a pair of X-ray calipers having a scale that is applied after the calipers are made and which may be replaced.

The foregoing and other objects and advantages will become apparent to those skilled in the art by referring to the following description and the accompanying drawings, wherein:

FIGURE 1 is a perspective view of X-ray calipers made in accordance with the present invention, FIGURE 2 is an enlarged elevational view of the scale end of the calipers of FIGURE 1, FIGURE 3 is an enlarged perspective view of the slide portion of the novel calipers, FIGURE 4 is a plane view of the portion of the calipers of FIGURE 3 that is taken on line 4—4 of FIGURE 1, FIGURES 5 and 6 are plane views of an unbent spring plate and cover plate, respectively, embodied in the slide of the novel calipers, FIGURES 7 and 8 are enlarged perspective views of modified scale portions illustrating means of applying a scale to the novel modified calipers.

Referring now to the drawings, the novel calipers 10 have an L-shaped member formed by a back portion or rail 11 and a fixed arm 12. Both the rail 11 and fixed arm 12 are integrally formed as shown in FIGURE 1 from a metal strip stock of uniform width and thickness, such as to be rigid and self-supporting with relation to each other. It is to be noted that the rail 11 and fixed arm 12 are at right angles to each other. An arm 20 has a slide portion 21 at one end thereof which rides on the rail 11. The arm 20 is formed of stock similar to that of the rail 11 and arm 12 and is disposed in a plane normal to the plane of the rail 11 and the arm 12, and at the longitudinal axis of said rail 11. By varying the distance between the fixed arm 12 and arm 20, the thickness of a portion of the body disposed therebetween can be measured. Rail 11 has a scale applied to the surface thereof, as shown in FIGURE 2, opposite from arm 12 which indicates the distance in inches and centimeters from fixed arm 12. Thus, when the body is measured, the edge of arm 20 closest to arm 12 will indicate the thickness of the body portion or the distance between the arms 12 and 20.

Modified scale means are shown in FIGURES 7 and 8 wherein the rail 11 is recessed along its length to receive a scale member 18. More specifically, back portion or rail 11 has edge ribs or beads 14 which form a recess 13 therebetween for housing the scale 18. Ribs or beads 14 provide spaced face surfaces 15 which are parallel as shown in FIGURE 7 for easy insertion of scale 18. In this instance, scale 18 is glued or cemented to the rail 11. Alternately, as shown in FIGURE 8, beads 14 may have inversely beveled surfaces 16 forming a dove tail like joint to receive scale 18 with a snap action locking the scale in place.

Slide 21 is formed by bending one end of arm 20 to provide a loop at right angles thereto, defining a slot to receive the rail 11 and with the terminal spaced from the arm 20 to provide a narrow gap 21a, as clearly shown in FIGURES 3 and 4. One side of the slide 21 rides on ribs or beads 14 spaced from the scale 18 while a pair of spring fingers bear against the other side of the rail 11. A plate member 22 has a bifurcated end forming spring fingers 23 and 24 which are bent oppositely from one another. A plurality of rivets 26 or other such fasteners extend through a cover plate 25, plate member 22 and sliding arm 20 to provide a fixed mounting of the plate member 22 carrying the spring.

As shown, a magnet 27 may be applied to arm 20 for hanging either the arm or the calipers 10 when not in use.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. An X-ray caliper comprising:
   (a) a rail member having inner and outer sides,
   (b) a fixed arm member extending from the inner side at one end of said rail member, formed integral therewith and normal thereto,
   (c) said rail member having a scale disposed on the outer side thereof for indicating distance from said fixed arm,
   (d) a movable arm having a lower rectilinear edge parallel to said fixed arm in all positions of said movable arm,
   (e) a slide member fixed to said movable arm having a slot to receive said rail member and slidably movable along the length of said rail member to position said movable arm in selected positions,
   (f) the lower end of said slide member and the rectilinear edge of said movable arm lying in the same plane such that said lower edge will indicate on the scale the distance between said fixed arm and movable arm,
   (g) a plate member having a pair of oppositely directed spring fingers at one end thereof,
   (h) said plate member being secured to said movable arm and extending through said slide member with said spring fingers engaging the inner side of said rail member,
   whereby to resiliently and clampingly hold the slide member and associated movable arm in position on said rail member.

2. The X-ray caliper of claim 1, wherein:

(a) said integral rail member and fixed arm is formed of flat stock of uniform width and thickness,
(b) said movable arm is formed of like flat stock and lying in a plane normal to the plane of said rail member at the longitudinal axis thereof,
(c) said slide member comprising a loop-shaped bent over integral end portion of said movable arm to define said slot,
(d) the terminal end of the flat stock forming said loop-shaped slide member being spaced from the juncture of said movable arm with said slide member to provide a gap,
(e) said plate member abutting the side of said movable arm opposite said terminal end and projecting through said gap to extend into said slide member, and
(f) means carried by said movable arm to support said caliper on a supporting surface.

References Cited by the Examiner
UNITED STATES PATENTS

| | | | |
|---|---|---|---|
| 629,025 | 7/99 | Bluthenthal | 33—2 |
| 1,254,197 | 1/18 | Berriman | 33—143 |
| 2,553,668 | 5/51 | Morrelo | 33—207 |
| 2,740,201 | 4/56 | Swanson | 33—161 |
| 2,799,942 | 7/57 | Ehler | 33—173 |

ISAAC LISANN, *Primary Examiner.*